United States Patent [19]

Kobayashi et al.

[11] Patent Number: 4,840,428
[45] Date of Patent: Jun. 20, 1989

[54] HEAD REST ADJUSTING DEVICE

[75] Inventors: Hideo Kobayashi; Yoshio Arai, both of Akishima, Japan

[73] Assignee: Tachi-S Co., Ltd., Tokyo, Japan

[21] Appl. No.: 211,222

[22] Filed: Jun. 24, 1988

[51] Int. Cl.⁴ ............................................. A47C 7/36
[52] U.S. Cl. .................................. 297/408; 297/391; 248/316.7
[58] Field of Search .............................. 297/408, 391; 248/316.7, 231.8, 231.7

[56] References Cited

U.S. PATENT DOCUMENTS

| | | | |
|---|---|---|---|
| 300,427 | 6/1884 | Zanger | 248/316.7 |
| 1,398,519 | 11/1921 | Hosch | 248/316.7 |
| 1,970,962 | 8/1934 | Hinckley | 248/316.7 |
| 2,432,435 | 12/1947 | Millette | 248/316.7 |
| 2,697,480 | 12/1954 | Du Bois et al. | 297/408 |
| 3,273,846 | 9/1966 | De Mare | 248/231.7 |
| 3,300,249 | 1/1967 | Schneider | 297/408 |
| 3,409,954 | 11/1968 | Schneider | 248/316.7 |
| 3,695,700 | 10/1972 | Flach . | |
| 4,606,578 | 8/1986 | Yasui | 297/408 |
| 4,682,817 | 7/1987 | Freber | 297/408 |

FOREIGN PATENT DOCUMENTS 2927702  1/1981  Fed. Rep. of Germany ...... 297/408

*Primary Examiner*—Francis K. Zugel
*Attorney, Agent, or Firm*—Browdy and Neimark

[57] ABSTRACT

A head rest adjusting device using a friction mechanism, which permits the forward and backward rotative adjustment of the head rest relative to a head rest stay. The friction mechanism comprises a substantially U-shaped leaf spring receiving the head rest stay therein, and a protruding resilient section is formed on the folded area of the leaf spring so as to give an additional resiliency to the leaf spring per se and thus provide a stable proper friction against the rotation of the head rest about the stay.

11 Claims, 2 Drawing Sheets

HEAD REST ADJUSTING DEVICE

BACKGROUND OF THE INVENTION

1. Field of the Invention

The present invention relates to an adjusting device for a head rest provided on an automotive seat, and in particular to the improvement of fore-and-aft adjusting device for head rest basically comprising a ⊓ shaped head rest stay whose lateral vertical leg portions are attached in the seat back and head rest mounted via a friction member on the hoizontal portion of the stay for allowing the forward and backward adjustment of the head rest relative to the seat.

2. Description of the Prior Art

A typical example of conventional head rest adjusting device using a friction means involves the one which employs a synthetic resin material for the frictional purpose as disclosed in the U.S. Pat. No. 3,695,700, in which a friction member of synthetic resin is wound about a head rest stay so that the head rest is angularly adjustable with the frictional effect of such friction member against the stay. This prior art has been found defective in that the friction member is not stable in its friction effect because of its high heat sensitivity resulting in the easy deformation under the changes of indoor temperature in the automobile and also under the frictional heat caused between the friction member and the stay, thus causing the difficulty of maintaining a constant frictional touch and control in the adjustment of the head rest.

Another type of the head rest adjusting device using a metallic friction means is known from the Japanese Utility Model Publication No. 60-36111, for instance, according to which its head rest frame is frictionally secured by a initially coned disc spring and small plate spring. But these friction means are contacted with the head rest frame in a small contact area, and consequently, there is no sufficient and stable frictional relationship between the friction means and head rest frame.

SUMMARY OF THE INVENTION

In view of the above-stated drawbacks inherent in both synthetic resin and small metallic spring, it is a first purpose of the present invention to provide an improved head rest adjusting device which attains a stable and sufficient friction for an optimal adjustment of the head rest in the forward and backward directions.

In accomplishing such purpose, the present invention includes a friction mechanism comprising a substantially U-shaped leaf spring, a head rest frame to which the leaf spring is fixed, and a securing member for securing the leaf spring to the head rest frame. In accordance with the present invention, such substantially U-shaped leaf spring is so formed to have, defined therein, a securing section to be secured by the securing member, a stay receiving section in which the stay of the head rest is frictionally received in a sandwiched way, and a protruding resilient section which projects continuously from the stay receiving section for the purpose of giving a resiliency to the stay receiving section.

Accordingly, the stay receiving section of the substantially U-shaped leaf spring is provided a sufficient resiliency by virtue of the protruding resilient section, thereby firmly and positively sandwiching therebetween the head rest stay, and therefore the leaf spring creates a desired sufficient friction effect to properly frictionally resist the forward and backward rotative movement of the head rest about the stay.

Further, it is a second purpose of the present invention to provide an improved arrangement in the foregoing head rest adjusting device, which is for preventing the leaf spring against deformation caused during its repeated use for a lengthy period of time.

To achieve the purpose, an upturned support section is formed at the lower end of the head rest frame, and the leaf spring is embraced and supported within the upturned support section. Accordingly, the leaf spring is protected thereby against undesired deformation which leads to variations in the friction effect of the leaf spring.

Still further, it is a third purpose of the present invention to provide a rotation limiting means in the foregoing head rest adjusting device, which limits the forward and backward rotation range of the head rest frame relative to the stay.

To this end, the present invention includes a stopper fixed on the head rest stay in such a manner that when the head rest frame is rotated forwardly or backwardly to an extreme point, the rear surface thereof is brought to abutment against the stopper, so as to limit the rotation range of the head rest. In this regard, preferably a pair of the leaf springs are arranged on the stay and the stopper is disposed therebetween, to thereby advantageously avoid the undesired movement of the leaf springs on the stay in its longitudinal direction.

DETAILED DESCRIPTION OF PREFERRED

Reference is made to FIGS. 1 through 4, which show a first embodiment of the present invention. As in FIG. 1, there is rotatably mounted a head rest frame (2) on a head rest stay (1) via a friction mechanism (a), with an upturned support section (21) formed at the lower end of the head rest farme (2).

Figure 4:
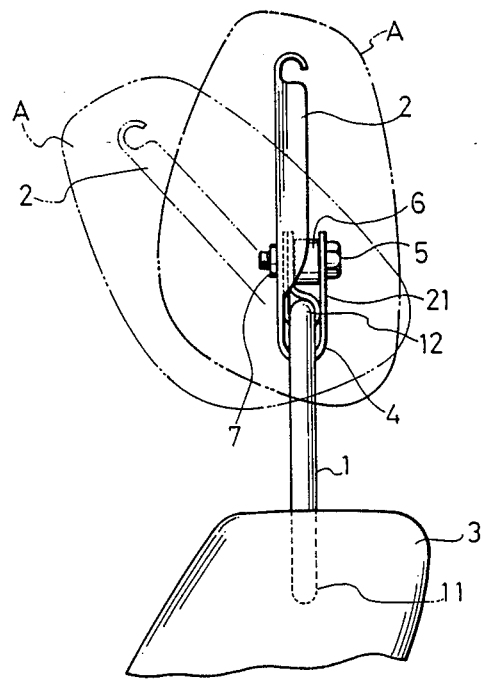
FIG. 4 is a side view of the same embodiment as in the FIG. 1.

Now, specfically, the head rest stay (1) is so formed in a ⊓-shaped configuration as to comprise a horizontal portion (12) and a pair of vertical leg portions (11)(11) bent and extended vertically downwards from both ends of the horizontal portion (12). The lower end parts of the vertical leg portions are mounted in a seat back (3) of an automotive seat (not shown in details), as shown in FIG. 4, such that the vertical leg portions may be moved vertically relative to the seat back (3) for the head rest vertical adjustment purpose.

On the horizontal portion (12) of the stay (1), there are provided friction mechanisms (a) which comprise a pair of substantially U-shaped metalic leaf springs (4)(4)

which are attached about the horizontal portion (12) in a spaced-apart relation with each other.

Figure 3:
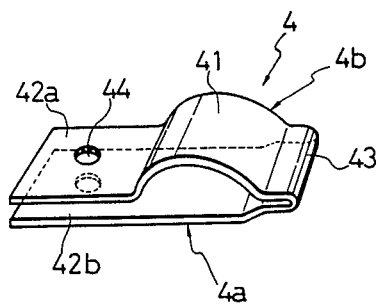
FIG. 3 is a perspective view of a substantially U-shaped leaf spring in the present invention.

As best shown in FIG. 3, each of the leaf springs (4)(4) is formed by folding together both ends thereof corresponding to a pair of securing sections (42a)(42b) which will be described below, so as to represent a generally U shape in section, comprising a flat mounting section (4a) adapted for mounting the spring (4) per se to the rear surface of the head rest frame (2), a pair of opposed, spaced-apart securing sections (42a)(42b) defined at the upper part of the spring (4) in a flat manner, a folded portion (4b) defined at the lower part of the spring (4), a protruding resilient section (43) integrally formed on the folded portion (4b), projecting outwardly in a substantially U shape in section, and an arcuate stay receiving section (41). Designation (44) denotes a securing opening which is perforated in each of the pair of securing sections (42a)(42b). A bolt (5) passes through securing opening (44).

The upturned support section (21) of the head rest frame (2), which forms a part of the friction mechanism (a), is integrally turned upwardly from the lower end of the head rest frame (2) and adapted for embracingly supporting the substantially U-shaped leaf springs (4) therein. In that upturned support section (21), a pair of securing holes (21a)(21a) are formed which are respectively disposed in correspondence with the securing openings (44) of the securing sections (42a)(42b).

The head rest frame (2) also has a pair of securing holes (2a)(2a) perforated therein, each being arranged at the same point with the securing holes (21a)(21b) respectively.

Figure 1:
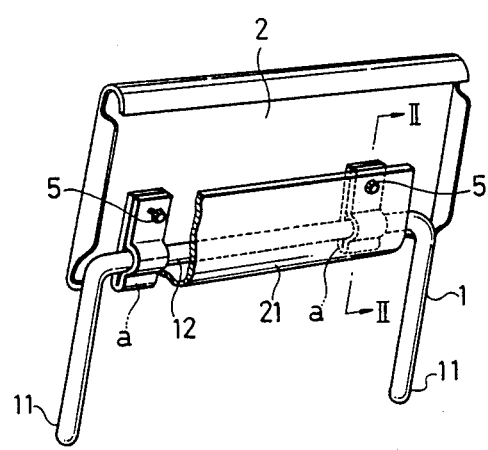
FIG. 1 is a partially broken perspective view of a first embodiment of the present invention.
Figure 2:
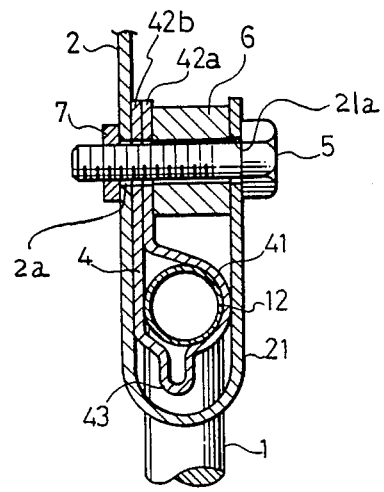
FIG. 2 is a longitudinally sectional view taken along the line II—II in the FIG. 1.

As best seen in FIG. 2, the bolt (5) passes through the foregoing concentrically aligned securing holes and openings (21a, 44, 2a) and connected with a nut (7), with a washer (6) interposed between the upturned support section (21) of the head rest frame (2) and securing sections of the leaf springs (4), to thereby firmly secure them all together.

The arcuate stay receiving section (41) of the leaf spring (4) has a greater radius than that of the head rest stay (1), and is adapted to receive the horizontal portion (12) of the stay (1). In this respect, the radius of the arcuate stay receiving section (41) is of such a degree as to give a proper friction effect against the horizontal portion (12) when the leaf spring (4) per se is secured to the head rest frame (2) with the upturned support section (21) thereof by means of the bolt (5) and nut (7).

Thus, the horizontal portion (12) of the stay (1) is clipped with a proper friction between the stay receiving section (41) and the flat mounting section (4a) of the leaf spring (4) by virtue of the resiliency of the protruding resilient section (43) which biases those two opposed sections of the leaf spring (4) towards each other, and such complementary resilient function advantageously serves to bring the inner surface of the arcuate stay receiving section (4a) to full contact with the horizontal portion (12) of the stay (1), so that a generally uniform distribution of embracing force is created in the arcuate stay receiving section (4a) against the horizontal portion (12).

The head rest frame (2) is enclosed by a suitable upholstery including a foam cushion member (not shown) to constitute a head rest (A) as shown by the phantom line in FIG. 4.

With the above-described structure, referring to FIG. 4, when the head rest (A) is rotated forwardly or backwardly relative to the stay (1) against the frictional resistance of the leaf springs (4), the position of the head rest (A) is adjustably displaced between the upright standing point and forwardly inclined point that is understandable from the head rest frame (2) in a solid line and that in a two-dot chain line. Hence, the inclination of the head rest (A) can be adjusted to any desired point in the forward and backward directions with respect to the head rest stay (1).

Accordingly, in the present embodiment, it is appreciated that the provision of the protruding resilient section on the leaf spring gives an additional resiliency to the leaf spring, thereby compensating a resiliency especially for the portion of the spring whose resiliency tends to be reduced easier due to a long period of use, and that the upturned support section of the head rest frame embraces and retains therein the leaf springs so that the latter is protected against deformation, thus improving the durability thereof.

Figure 5:
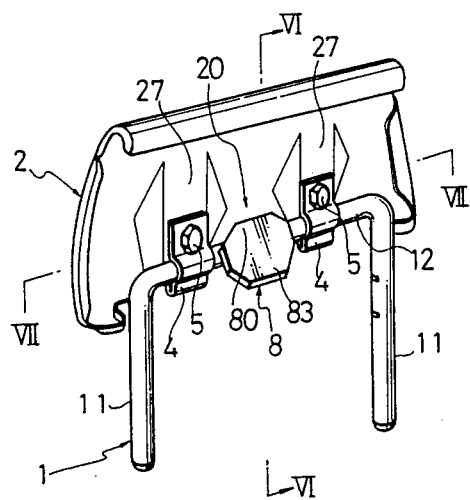
FIG. 5 is a perspective view of a second embodiment of the present invention.
Figure 6:
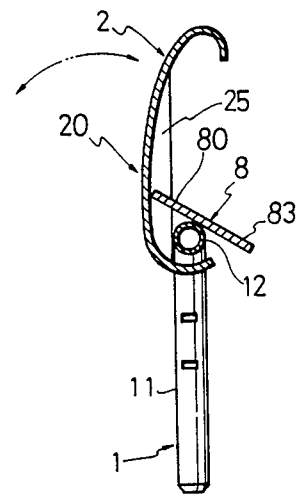
FIG. 6 is a longitudinally sectional view taken along the line VI—VI in the FIG. 5.
Figure 7:
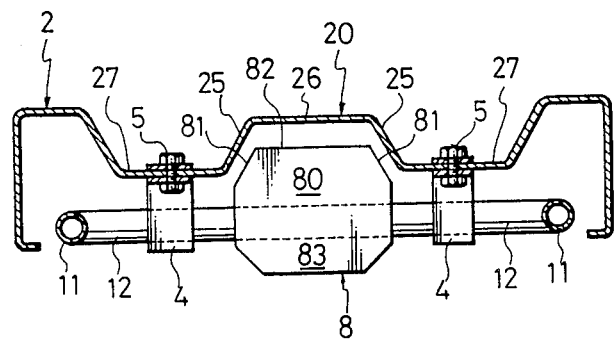
FIG. 7 is a cross-sectional view taken along the line VII—VII in the FIG. 5.

Now, reference is made to FIGS. 5 through 7, in which a second embodiment of the present invention is illustrated.

According to this second embodiment, there is provided a head rest frame (2), which, in contrast to the aforementioned first embodiment, is formed with a pair of spaced recessed portions (27)(27) projecting rearwardly of the frame (2), thus defining two recesses at the frontal side thereof. This head rest frame (2) may be made of rigid synthetic resin material or metallic material, and is rotatably secured on the horizontal portion (12) of a head rest stay (1) similar to the one of the first embodiment via a pair of substantially U-shaped leaf springs (4)(4) constructed in the same fashion as in the first embodiment. In this particular embodiment, the leaf springs (4)(4) are respectively secured on the rearwardly projected surfaces of the recessed portions (27)(27) of the head rest frame (2) by means of bolts (5)(5), as shown. It is noted that those two recessed portions (27)(27) are provided for the purpose of reinforcing the rigidity of the head rest frame (2).

Between the pair of recessed portions (27)(27), there is defined a projected portion (20) in the central area of the head rest frame (2), which projects in a direction forwardly thereof as opposed to the recessed portions (27)(27), with its top surface (26) being register or even with the frontal whole surface of the head rest frame (2) in parallel with the horizontal portion (12) of the head rest stay (1), as best seen in FIG. 7. The projected portion (20) has a pair of lateral inclined walls (25)(25) so formed that they are inclined at a certain angle from the top surface (26), extending in a divergent manner therefrom.

Accordingly, similarly to the first embodiment, the head rest frame (2) is rotatable forwardly and backwardly relative to the stay (1) with a proper friction given by the leaf springs (4)(4), and thus is adjustable its position in the same way as indicated in FIG. 4.

On the central point of the horizontal portion (12) of the head rest stay (1), a stopper plate (8) is welded such that it is disposed midway between the two leaf springs (4)(4), with a view to limiting the forward and backward rotation range of the head rest frame (2). Specifically, the stopper plate (8) comprises a forward stopper section (80) defined at the forward half thereof relative to the horizontal portion (12) of the stay (1), projecting towards the rear side of the top surface (26) of the projected portion (20), and a rearward stopper section (83) defined at the rearward half thereof relative to the horizontal portion (12) of the stay (1), projecting in a direction rearwardly of the stay (1). The forward stopper section (80) is formed such that it has an upper edge (82) and a pair of inclined lateral portions (81)(81) which are inclined in a divergently extending relation with each other from the upper edge (82) at an angle identical to that of the lateral inclined walls (25)(25) of the projected portion (20) of the head rest frame (2), respectively, whereupon the forward stopper section (80) has a generally trapezoidal shape, as illustrated.

The thus-formed stopper plate (8) is welded in an upwardly inclined state to the horizontal portion (12) of the stay (1) at a suitable inclination angle in accordance with a desired maximum and minimum inclination angle limits of the head rest frame (2) with respect to the stay (1).

It is therefore seen that, when the head rest frame (2) is rotated backwardly to an extreme point, the rear surface of the projected portion (20) thereof is brought to abutment against the upper edge (82) of the stopper plate (8), thereby limiting the further forward rotation of the head rest frame (2), whereas on the other hand, when the head rest frame (2) is rotated forwardly to an extreme point, the lower part of the head rest frame (2) is brought to abutment against the rearward stopper section (80) and prevented from its further rearward rotation, thereby limiting the backward rotation of the head rest frame (2).

The present second embodiment is endowed with the following attendant effects:

1. As clearly understandable from FIG. 7, the forward stopper section (80) of the stopper plate (8) is bodily placed within the recess defined at the rear side of the projected portion (20) of the head rest frame (2). This means that the forward stopper section (80) is substantially in a moveable engagement within the rear side of the projected portion (2), and therefore, the head rest frame (2) can easily be positioned precisely at its determined point on the stay (2) and secured thereupon, with the guide effect realized by the combination of the stopper plate (8) and the recessed rear side of the projected portion (20).

2. The head rest frame (2) is positively prevented from its undesired movement along the longitudinal direction of the horizontal portion (12) of the stay (1), because when the head rest frame (2) is moved in that longitudinal direction, one of the lateral inclined walls (25)(25) of the projected portion (20) is abutted against one of the inclined lateral portions (81)(81).

Accordingly, assembling the head rest device is easily and accurately effected, with a far increased rapidity.

While the description has been given of preferred embodiments of the present invention, it should be understood that the invention is not limited to the illustrated embodiments, but various other replacements, modifications and additions may structurally be possible without departing from the scope and spirit of the appended claims for the invention.

What is claimed is:

1. A head rest adjusting device in which the head rest is adjustably inclined forwardly and backwardly relative to a head rest stay, comprising:
   a head rest frame;
   a friction mechansim including at least one substantially U-shaped leaf spring made of metallic material, said leaf spring being wound about the head rest stay and comprising a securing section, a stay receiving section adapted for receiving therein of said head rest stay, and a protruding resilient section integrally formed on said stay receiving section, said protruding resilient section being adapted to provide a resiliency to said stay receiving section; and
   means for securing said friction mechanism to said head rest frame.

2. The head rest adjusting device according to claim 1, wherein said head rest frame is formed integrally with a turned support portion for embracing supporting therein said friction mechanism to thereby prevent deformation of said friction mechanism.

3. A head rest adjusting device in which the head rest is adjustably inclined forwardly and backwardly relative to a head rest stay, comprising:
   a head rest frame;
   a friction mechanism including at least one substantially U-shaped leaf spring made of metallic material, said leaf spring being wound about the head rest stay and comprising:
     (a) a flat mounting section adapted for mounting said leaf spring on said head rest frame;
     (b) a pair of securing sections defined at an upper part of said leaf spring;
     (c) a folded portion defined at a lower part of said leaf spring such that it is disposed between said pair of securing sections;
     (d) a protruding resilient section formed on said folded portion, projecting outwardly in a manner being substantially U-shaped in section; and
     (e) an arcuate stay receiving section adapted for receipt therein of said head rest stay,
   wherein said protruding resilient section provides a resiliency to said arcuate stay receiving section, to thereby cause said leaf spring to frictionally hold said head rest stay therein; and
   means for securing said pair of securing sections of said leaf spring to a rear surface of said head rest frame, thereby securing said friction mechanism to said head rest frame.

4. The head rest adjusting device according to claim 3, wherein said head rest frame is formed integrally with an upturned support portion, and wherein said upturned support portion extends from the rear side of said head rest frame in an upward direction and is adapted for embracing and supporting therein said friction mechanism to thereby prevent deformation of said friction mechanism.

5. The head rest adjusting device according to claim 1, wherein said head rest frame is made of metallic plate.

6. The head rest adjusting device according to claim 3, wherein said head rest frame is made of metallic plate.

7. The head rest adjusting device according to claim 2, wherein said turned support portion extends and turns from a rear surface of said head rest frame, and wherein said friction mechanism is secured together with said turned support portion to said rear surface of said head rest frame.

8. The head rest adjusting device according to claim 1, wherein said head rest frame is so formed as to define a projected portion therein whose rear side is recessed, wherein there is further provided a stopper means at a central point of said head rest stay, said stopper means being so formed that it is disposed within the recessed rear side of said projected portion of said head rest frame, and wherein said stopper means are adapted to limit forward and backward rotation range of said head rest frame relative to said head rest stay.

9. The head rest adjusting device according to claim 8, wherein said projected portion of said head rest frame is formed substantially in a trapezoid shape in section, and said stopper means is also formed substantially in a trapezoid shaped contour so that the latter is bodily positioned within the recessed rear side of said projected portion in a movable manner.

10. The head rest adjusting device according to claim 1, wherein said head rest frame is so formed as to define a projected portion therein whose rear side is recessed, wherein there is further provided a stopper means at a central point of said head rest stay, said stopper means being so formed that it is disposed within the recessed rear side of said projected portion of said head rest frame, and wherein said stopper means are adapted to limit forward and backward rotation range of said head rest frame relative to said head rest stay.

11. The head rest adjusting device according to claim 10, wherein said projected portion of said head rest frame is formed substantially in a trapezoid shape in section, and said stopper means is also formed substantially in a trapezoid shaped contour so that the latter is bodily positioned within the recessed rear side of said projected portion in a movable manner.

* * * * *